Patented Jan. 5, 1954

2,665,271

UNITED STATES PATENT OFFICE 2,665,271

POLYMERIZATION OF N-VINYL LACTAMS

Hans Beller, Cranford, N. J., assignor to General Aniline & Film Corporation, New York, N. Y., a corporation of Delaware No Drawing. Application October 25, 1951, Serial No. 253,211

3 Claims. (Cl. 260—88.3)

This invention relates to an improved method for the polymerization of N-vinyl lactams, particularly, N-vinyl-α-pyrrolidone.

Polymeric N-vinyl lactams have been described and claimed in U. S. P. 2,265,450, issued December 9, 1941, to Walter Reppe et al. As disclosed in this patent, polymeric N-vinyl lactam may be prepared by treating a monomeric N-vinyl lactam with an aqueous solution of a water soluble neutral sulfite in a from neutral to basic medium. A further method of preparing N-vinyl lactams is described and claimed in U. S. P. 2,335,454, issued November 30, 1943, to Curt Schuster et al. which comprises heating an N-vinyl lactam with a polymerization catalyst capable of supplying oxygen under the reaction conditions and selected from the class consisting of inorganic peroxides and organic peroxides.

In operating in accordance with the last mentioned patent, it has been found that the molecular weight range of the polymers thus produced may be most readily varied by varying the amount of peroxide which is used to catalyze the polymerization. The molecular weight varies inversely with the concentration of the peroxide. However, it has also been found that when the polymerization is effected as indicated, the polymer obtained usually retains some residual monomer even though the time of polymerization is extended. These polymers, particularly polymeric N-vinyl pyrrolidone, have been found to have improved physiological applications such as substitutes for blood plasma and as drug extenders and detoxifiers and the presence of residual monomer in the polymer is undesirable from a toxological standpoint. Spray drying of the product has been found to effect some reduction in the residual monomer content of the product. Heretofore the residual monomer has commonly been removed from the polymer by solvent extraction. However, this is a costly and time-consuming operation. It is therefore an object of this invention to provide an improved process for polymerizing N-vinyl lactams by which polymeric products which are free of residual monomer may be readily obtained.

I have now found that polymeric N-vinyl lactams, which are free of residual monomer, may be more readily and inexpensively produced if, following the polymerization proper in the presence of peroxide catalyst, the polymer containing residual monomer is subjected to a secondary after-polymerization in the manner more fully described below.

This after-polymerization, which eliminates the residual monomer, is effected by the addition of more peroxide to the reaction mixture after the polymerization is essentially complete followed by an additional period of heating or, if preferred, the after-polymerization may be accomplished by raising the temperature of the reaction mixture after the polymerization is essentially complete. It is not possible to add additional peroxide initially in order to achieve the same result for, as stated above, the molecular weight of the polymer varies inversely with the concentration of the peroxide and the molecular weight of the polymer will then be below the desired range. Likewise, carrying out the entire polymerization at a higher temperature has an adverse effect on the quality of the polymer.

In practicing the present invention, the monomeric N-vinyl lactam is first polymerized in the manner heretofore used in the art by heating the monomer in the presence of an amount of a peroxide catalyst, preferably in aqueous solution and in the presence of an activator such as ammonia or an amine until the polymerization is essentially complete, i. e., until further polymerization ceases as evidenced, for example, by the degree of unsaturation in withdrawn samples of the product remaining substantially constant.

The specific reaction conditions employed in this principal or primary polymerization will correspond to those heretofore used in the art. Thus, the amount of catalyst employed therein will vary with the molecular weight desired in the polymer. As stated, the molecular weight of the polymer which is obtained under given conditions varies inversely with the amount of catalyst employed and with any given monomer and polymerization catalyst the amount of catalyst necessary to obtain a polymer of specific molecular weight is determined by preliminary experiment for the particular reaction conditions to be employed. Likewise, the temperature to be employed for polymerization should be determined by preliminary experiment.

As the polymerization proceeds, samples are withdrawn from time to time and tested for their degree of unsaturation as an indication of the amount of monomer remaining therein. The degree of unsaturation of the product may be tested conveniently by titrating the product with an iodine solution, using starch as an indicator and back titrating with a sodium thiosulfate solution. On completion of the primary polymerization, i. e., when no further polymerization occurs as evidenced, for example, by the degree of unsaturation of the product remaining constant, the reaction product, if it contains more residual monomer than will be removed by spray drying, may be subjected to an "after polymerization" in accordance with this invention, to effect the removal of residual monomer but without substantial effect on the molecular weight of the product. This "after polymerization" may be effected either by the addition of further amount of peroxide catalyst, raising the temperature of the reaction mixture or by a combination of these two procedures. The amount of additional peroxide catalyst which should be added to effect removal of the residual monomer will vary with the particular catalyst employed and the particular monomer being polymerized and the amount of residual monomer in the product, but the required amount can be determined by preliminary experiment. Similarly, the temperature to which the reaction mixture should be raised in case the temperature is also being adjusted to complete the polymerization and thus effect removal of residual monomer may be determined by preliminary test.

As stated, it is desirable that the monomer content of the N-vinyl pyrrolidone be as low as possible, and for most applications the polymer should analyze less than one per cent unsaturation, calculated as N-vinyl pyrrolidone and, preferably, less than 0.5 per cent such unsaturation. While the degree of unsaturation of the product is a convenient test for residual monomer, it is probable that the polymers of N-vinyl pyrrolidone, themselves, have some terminal unsaturation, and polymers analyzing a fractional per cent unsaturation are acceptable for use. The degree of unsaturation of the polymers obtained by the prior art processes will vary with different batches of monomer, possibly due to slight differences in impurities, and also with different batches of polymer from the same monomer, possibly due to slight differences in polymerization conditions. When the polymer analyzes less than about one per cent of unsaturation, calculated as N-vinyl pyrrolidone, the unsaturation of the product is frequently reduced to an acceptable figure by spray drying, probably through vaporization of the residual monomer along with water in the spray drying process. In such cases the after-polymerization of the present invention need not be used. Thus, one batch of N-vinyl pyrrolidone is polymerized in the following manner:

The polymerization kettle was charged with 144 pounds of N-vinylpyrrolidone,
144 pounds of distilled water,
1634 ml. hydrogen peroxide 35%,
1307 ml. ammonium hydroxide 28%.

The mixture was heated for 11 hours at 50° C. A sample was obtained, and upon titration with 0.01 N iodine solution using starch as an indicator, it was found that 0.65 per cent unsaturation remained calculated as N-vinylpyrrolidone. After spray-drying the dry product analyzed 0.36 per cent unsaturation calculated as N-vinylpyrrolidone, and was thus satisfactory.

However, where the degree of unsaturation of the polymer is such that it is not reduced to an acceptable figure by spray drying, the after-polymerization process of the present invention may be used to good advantage. The details of this after-polymerization will be apparent from a consideration of the following examples:

*Example I*

The polymerization kettle was charged with 160 pounds of N-vinylpyrrolidone,
160 pounds of distilled water,
2,178 ml. hydrogen peroxide 35%,
1,452 ml. ammonium hydroxide 28%.

The mixture was heated for 11 hours at 50° C., the batch cooled and subsequently spray-dried. The dry product analyzed 3.08 per cent unsaturation calculated as N-vinylpyrrolidone using 0.01 N-iodine solution.

One pound of the above product was dissolved in 6.6 pounds of distilled water. To this solution was added 18 ml. of ammonium hydroxide 28%, and 18 ml. of hydrogen peroxide 35%.

Immediately after the addition of the hydrogen peroxide the batch was transferred to the spray dryer. After drying the product analyzed 1.1 per cent unsaturation calculated N-vinylpyrrolidone using 0.01 N iodine solution.

One additional treatment with hydrogen peroxide and ammonium hydroxide in the same manner as above, reduced the unsaturation to 0.65 per cent.

*Example II*

The polymerization kettle was charged with 50 pounds of N-vinylpyrrolidone,
50 pounds of distilled water,
681 ml. of hydrogen peroxide 35%,
461 ml. of ammonium hydroxide 28%.

The mixture was heated for 18 hours at 50° C. A sample was obtained, and upon titration with 0.01 N iodine solution, it was found that 5.8 per cent unsaturation remained calculated as N-vinyl pyrrolidone.

To the batch was then charged an additional 2 per cent (by weight) hydrogen peroxide based on the N-vinylpyrrolidone charged. The batch was heated an additional 4 hours at 50° C., after which time, an analysis of the batch indicated 0.87 per cent unsaturation calculated as N-vinylpyrrolidone.

The batch was subsequently spray-dried yielding a product having a residual 0.27 per cent unsaturation calculated as N-vinylpyrrolidone and was satisfactory.

I claim:

1. In the process of producing polymerization products of N-vinyl lactams wherein an N-vinyl lactam is mixed with a polymerization catalyst capable of supplying oxygen under the reaction conditions and selected from the class consisting of inorganic peroxides and organic peroxides and the thus obtained mixture is heated to effect polymerization; the method of reducing the residual monomer content of the thus obtained polymerization product when said polymerization product contains more than one per cent residual unsaturation, after the degree of unsaturation of the reaction mixture becomes constant; which comprises adding to the said reaction mixture after the degree of unsaturation thereof remains constant an additional amount of said catalyst and further heating said mixture to thereby polymerize the N-vinyl lactam still in said reaction product and thus reduce the amount of residual monomer therein.

2. The process as defined in claim 1 wherein the N-vinyl lactam specified is N-vinyl-α-pyrrolidone.

3. The process as defined in claim 2 wherein the peroxide polymerization catalyst specified is hydrogen peroxide.

HANS BELLER.

References Cited in the file of this patent

Kline Modern Plastics, November 1945, pages 157–161, 212, 214, 216, 218.